United States Patent
du Toit et al.

(10) Patent No.: US 9,098,373 B2
(45) Date of Patent: Aug. 4, 2015

(54) SOFTWARE UPDATE METHODOLOGY

(71) Applicants: Roelof Nico du Toit, Portersville, PA (US); Noah Zev Robbin, Swissvale, PA (US); Jason Scott McMullan, Pittsburgh, PA (US)

(72) Inventors: Roelof Nico du Toit, Portersville, PA (US); Noah Zev Robbin, Swissvale, PA (US); Jason Scott McMullan, Pittsburgh, PA (US)

(73) Assignee: NETRONOME SYSTEMS INCORPORATED, Santa Clara, CA (US)

(*) Notice: Subject to any disclaimer, the term of this patent is extended or adjusted under 35 U.S.C. 154(b) by 127 days.

(21) Appl. No.: 13/741,310

(22) Filed: Jan. 14, 2013

(65) Prior Publication Data
US 2014/0201728 A1   Jul. 17, 2014

(51) Int. Cl.
G06F 15/177 (2006.01)
G06F 15/173 (2006.01)
G06F 9/00 (2006.01)
G06F 9/24 (2006.01)
G06F 9/44 (2006.01)
G06F 9/445 (2006.01)
G06F 7/04 (2006.01)

(52) U.S. Cl.
CPC ........................... *G06F 8/65* (2013.01)

(58) Field of Classification Search
CPC ............... G06F 8/61; G06F 8/65; G06F 8/60; G06F 9/45558; G06F 11/1433; G06F 21/123; G06F 21/128; G06F 21/57; G06F 21/575; G06F 21/552
See application file for complete search history.

(56) References Cited

U.S. PATENT DOCUMENTS

| | | | | |
|---|---|---|---|---|
| 7,051,327 B1* | 5/2006 | Milius et al. | | 717/177 |
| 7,313,682 B2* | 12/2007 | Kanapathipillai et al. | | 717/168 |
| 7,827,263 B1* | 11/2010 | Howarth et al. | | 709/223 |
| 7,865,952 B1* | 1/2011 | Hopwood et al. | | 726/27 |
| 2004/0194081 A1* | 9/2004 | Qumei et al. | | 717/173 |
| 2006/0053272 A1* | 3/2006 | Roth et al. | | 713/1 |
| 2007/0061372 A1* | 3/2007 | Appavoo et al. | | 707/200 |
| 2008/0229114 A1* | 9/2008 | Okabe | | 713/189 |
| 2009/0013318 A1* | 1/2009 | Aderton et al. | | 717/171 |
| 2010/0023602 A1* | 1/2010 | Martone | | 709/220 |
| 2012/0036346 A1* | 2/2012 | Bower et al. | | 713/2 |

* cited by examiner

*Primary Examiner* — Don Wong
*Assistant Examiner* — Anibal Rivera
(74) *Attorney, Agent, or Firm* — Imperium Patent Works; T. Lester Wallace; Mark D. Marrello

(57) ABSTRACT

Software update information is communicated to a network appliance either across a network or from a local memory device. The software update information includes kernel data, application data, or indicator data. The network appliance includes a first storage device, a second storage device, an operating memory, a central processing unit (CPU), and a network adapter. First and second storage devices are persistent storage devices. In a first example, both kernel data and application data are updated in the network appliance in response to receiving the software update information. In a second example, only the kernel data is updated in the network appliance in response to receiving the software update information. In a third example, only the application data is updated in the network appliance in response to receiving the software update information. Indicator data included in the software update information determines the data to be updated in the network appliance.

16 Claims, 9 Drawing Sheets

SOFTWARE UPDATE (KERNEL AND APPS) PROCEDURE

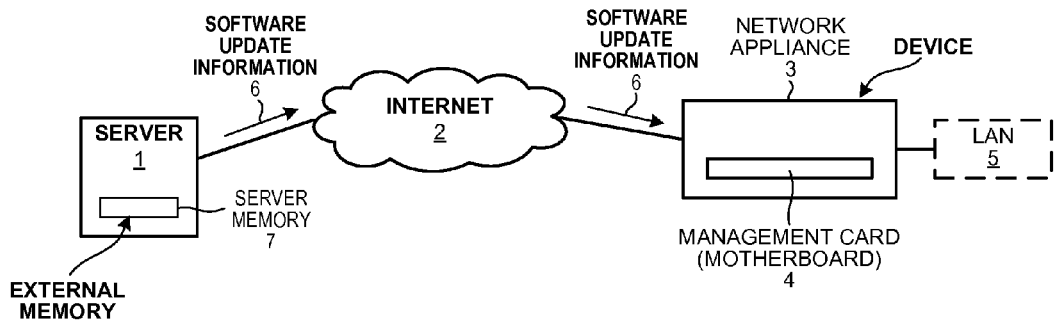

SOFTWARE UPDATE INCLUDES KERNAL DATA AND/OR APPLICATION DATA

COMMUNICATION OF A SOFTWARE UDPATE TO A
NETWORK APPLIANCE

FIG. 1

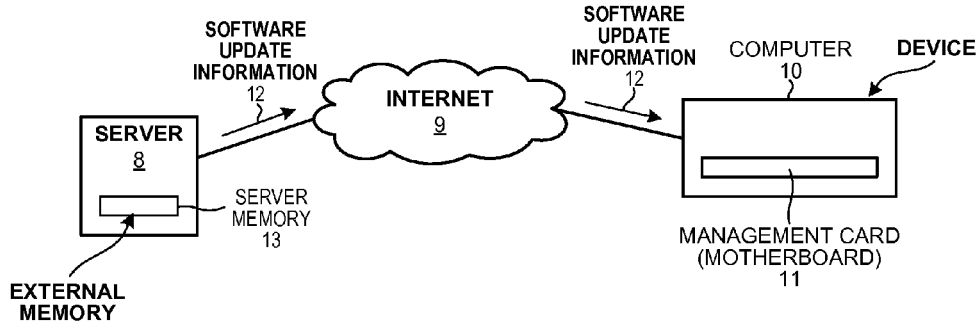

SOFTWARE UPDATE INCLUDES KERNAL DATA AND/OR APPLICATION DATA

COMMUNICATION OF A SOFTWARE UPDATE TO A COMPUTER

FIG. 2

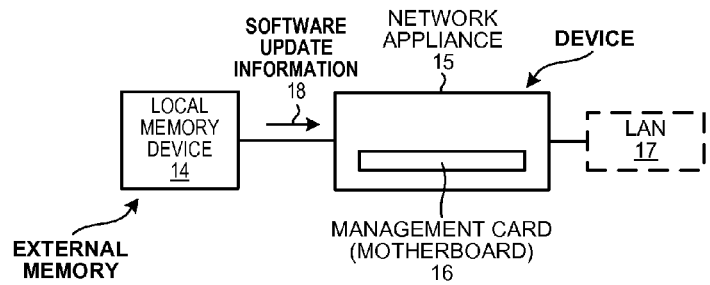

LOCAL MEMORY DEVICE MAY BE UNIVERSAL SERIAL BUS DRIVE, COMPACT DISC, PORTABLE HARD DRIVE, ETC.
SOFTWARE UPDATE INCLUDES KERNAL DATA AND/OR APPLICATION DATA

COMMUNICATION OF A SOFTWARE UPDATE TO A COMPUTER

FIG. 3

NETWORK APPLIANCE

INDICATOR DATA MAY BE ONE OR MORE FLAG BITS OR MAY BE ONE OR MORE FILES.
SOFTWARE UPDATE INFORMATION MAY INCLUDE ONLY KERNEL DATA OR ONLY APPLICATION DATA.

SOFTWARE UPDATE INFORMATION

MANAGEMENT CARD (MOTHERBOARD) HARDWARE DIAGRAM

SOFTWARE UPDATE (APPS ONLY) PROCEDURE

SOFTWARE UPDATE (APPS ONLY) FLOWCHART

SOFTWARE UPDATE METHODOLOGY

TECHNICAL FIELD

The described embodiments relate generally to performing a software update and more particularly to performing a software update on a remote appliance.

BACKGROUND INFORMATION

A network appliance may run one of a variety of different operating systems. A main component of an operating system is the kernel. The kernel provides a bridge between applications and the data processing done at the hardware level. The kernel manages the various system resources, such as, the Central Processing Unit (CPU), system memory, and Input/Output (I/O) resources. Accordingly, the applications running on the network appliance utilize the various kernels via system calls to process data, read and write to memory, and to utilize I/O devices. Similarly, a network appliance may run a variety of applications. Applications running on a network appliance may vary from traffic metering applications to event reporting applications.

In the modern environment, network appliances are used in a variety of remote locations, such as, Network Operation Centers (NOC), server farms, commercial locations, as well as residential locations. The most recently released version of kernels and applications are installed in network devices prior to being installed in these various remote locations. However, the improvement of the kernels and applications continue after a network appliance is installed. Thus, resulting in installed network appliances with out-dated kernels and applications located at a variety of remote locations.

Similarly, a network appliance may be sold to an original equipment manufacturer (OEM). During the manufacturing process, a version of the kernel and application software is installed. However, many months may pass between the appliance being produced at the factory and the appliance being sold by the OEM. During this time, a new version of the kernel and application software may be released. Thus, machines produced at an earlier date will not have the most recent version of kernels and applications.

Additionally, different customers may want to vary the kernels and applications that run on their purchased network appliance. However, the resources required to locally update the kernels and applications on each network appliance at each of these various remote locations is not economically feasible due to the large number of network appliances and their varied locations. For at least the reasons listed above, a practical method for updating kernel and application data without local access to the network appliance is sought.

SUMMARY

Software update information is communicated to a network appliance either across a network or from a local memory device. The software update information includes kernel data, application data, or indicator data. The network appliance includes a first storage device, a second storage device, an operating memory, a central processing unit (CPU), and a network adapter. First and second storage devices are persistent storage devices.

In a first novel aspect, both kernel data and application data are updated in the network appliance in response to receiving the software update information. The software update information is received from an external memory across a network. The software information includes kernel data and application data. The kernel data and application data executing in the network appliance is replaced with the kernel data and application data included in the software update information.

In a second novel aspect, only the kernel data is updated in the network appliance in response to receiving the software update information. The software update information is received from an external memory across a network. The software information includes kernel data. The kernel data executing in the network appliance is replaced with the kernel data included in the software update information.

In a third novel aspect, only the application data is updated in the network appliance in response to receiving the software update information. The software update information is received from an external memory across a network. The software information includes application data. The application data executing in the network appliance is replaced with the application data included in the software update information.

In a fourth novel aspect, indicator data included in the software update information determines the type of data to be updated in the network appliance.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 1 is a diagram of the communication of a software update information to a network appliance across a network.

FIG. 2 is a diagram of the communication of a software update information to a computer across a network.

FIG. 3 is a diagram of the communication of a software update information from a local memory device to a network appliance.

DETAILED DESCRIPTION

Figure 4:
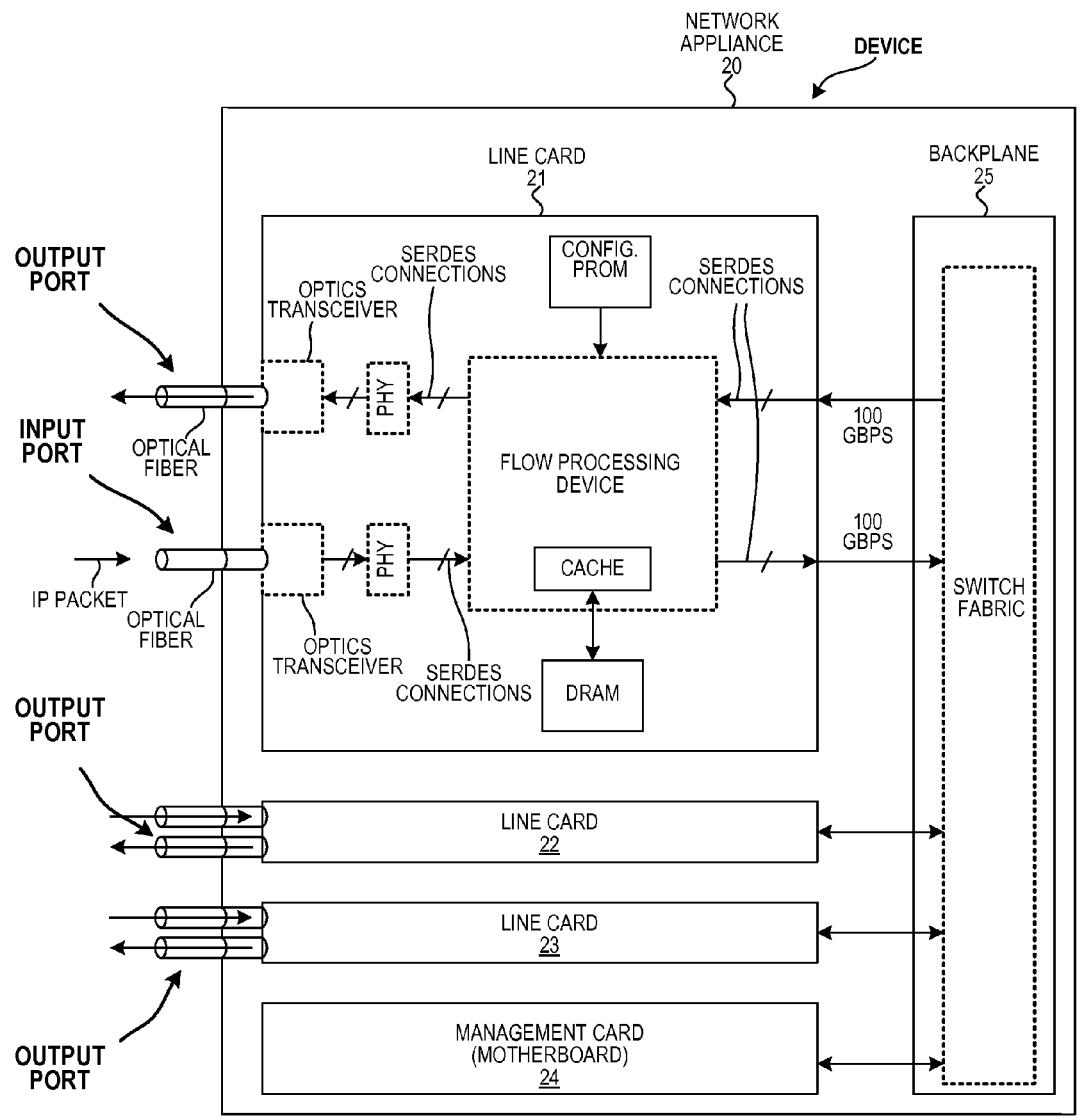
FIG. 4 is a diagram of a network appliance.

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

FIG. 1 is a diagram of the communication of a software update to a network appliance from a remote location. Software update information 6 is stored in server memory 7 within Server 1. Server memory 7 is one example of an external memory. Network appliance 3 includes a management card (also referred to as a motherboard) 4. The network appliance 3 may be connected to a local area network (LAN) 5. Server 1 is connected to the network appliance 3 via the internet 2. In the example illustrated in FIG. 1, the server 1 transmits the software update information 6 via the internet 2 to the network appliance 3. In one example, the server 1 is programmed to automatically transmit the software update information at a predetermined time. In a second example, the server 1 may transmit the software update information upon receiving a request to transmit the software update information. The request to transmit the software update information may be generated based upon a user input at the server terminal or by a remote request sent to the server from a remote terminal. In a third example, the request to transmit the software update information 6 is generated by the network appliance 3 and communicated via the internet 2 to the server 1.

The software update information may include kernel data, or application data, or both. A network appliance may run one of a variety of different operating systems. A main component of an operating system is the kernel. The kernel provides a bridge between applications and the data processing done at the hardware level. The kernel manages the various system resources, such as, the Central Processing Unit (CPU), system memory, and Input/Output (I/O) resources. Accordingly, the applications running on the network appliance utilize the various kernels via system calls to process data, read and write to memory, and to utilize I/O devices.

In addition to kernel data or application data, the software update information may also include indicator data. Indicator data may be a plurality of flags or a plurality flags which indicate what operation is to be performed by the network appliance with the received software update information. The plurality of flags may be one or more bits included in the software update information. In another example, the plurality of flags could be one or more files included in the software update information.

Software update information may also be communicated to a computer. FIG. 2 is a diagram of the communication of a software update to a computer across a network. Software update information 12 is stored in server memory 13 within Server 8. Server memory 13 is one example of an external memory. Computer 10 includes a management card (also referred to as a motherboard) 11. Server 8 is connected to the computer 10 via the internet 9. In the example illustrated in FIG. 2, the server 8 transmits the software update information 12 via the internet 9 to the computer 10. In one example, the server 8 is programmed to automatically transmit the software update information at a predetermined time. In a second example, the server 8 may transmit the software update information upon receiving a request to transmit the software update information. The request to transmit the software update information is generated based upon a user input at the server terminal or by a remote request sent to the server from a remote terminal. In a third example, the request to transmit the software update information 12 is generated by the computer 10 and communicated via the internet 9 to the server 8.

The software update information may include kernel data, or application data, or both. A network appliance may run one of a variety of different operating systems. A main component of an operating system is the kernel. The kernel provides a bridge between applications and the data processing done at the hardware level. The kernel manages the various system resources, such as, the Central Processing Unit (CPU), system memory, and Input/Output (I/O) resources. Accordingly, the applications running on the network appliance utilize the various kernels via system calls to process data, read and write to memory, and to utilize I/O devices.

In addition to kernel data or application data, the software update information may also include indicator data. Indicator data may be a plurality of flags or a plurality flags which indicate what operation is to be performed by the network appliance with the received software update information. The plurality of flags may be one or more bits included in the software update information. In another example, the plurality of flags could be one or more files included in the software update information.

FIG. 3 is a diagram of the communication of software update information 18 from a local memory device 14 to a network appliance 15. Software update information 18 is stored the local memory device 14. Local memory device 14 is one example of an external memory. Network appliance 15 includes a management card (also referred to as a motherboard) 16. The network appliance 15 may be connected to a local area network (LAN) 17. Local memory device 14 is directly connected to network appliance 15 via either a physical connection or via a wireless connection.

The software update information may include kernel data, or application data, or both. A network appliance may run one of a variety of different operating systems. A main component of an operating system is the kernel. The kernel provides a bridge between applications and the data processing done at the hardware level. The kernel manages the various system resources, such as, the Central Processing Unit (CPU), system memory, and Input/Output (I/O) resources. Accordingly, the applications running on the network appliance utilize the various kernels via system calls to process data, read and write to memory, and to utilize I/O devices.

In addition to kernel data or application data, the software update information may also include indicator data. Indicator data may be a plurality of flags or a plurality flags which indicate what operation is to be performed by the network appliance with the received software update information. The plurality of flags may be one or more bits included in the software update information. In another example, the plurality of flags could be one or more files included in the software update information.

FIG. 4 is a top-down diagram of a network appliance (router) 20. The network appliance includes a Flow Processing Device (FPD) and external memory (DRAM). The FPD includes a local memory cache. In operation the FPD receives incoming Internet Protocol (IP) packets and in turn reads packet flow data from the external memory (DRAM). The packet flow data is used by the FPD to process the received IP packet. Upon receiving the IP packet, the FPD sends a read request to the external DRAM memory. The FPD then performs a read from the external DRAM memory. The packet flow data read from the external DRAM memory is then stored in the local cache within the FPD. Then, only once the packet flow data is stored in the local cache, the FPD can begin the processing of the IP packet. This sequence of operation results in a time delay from when the IP packet is received by the FPD to when the FPD can begin processing the IP packet.

Figure 5:
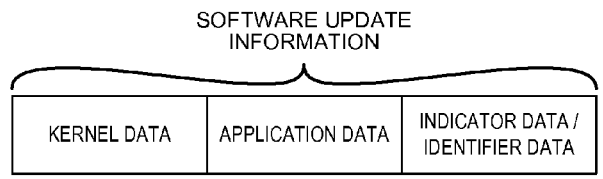
FIG. 5 is a diagram of data included in software update information.

FIG. 5 is a diagram of the various data that may be included in the software update information. The software update information may include kernel data, application data, or indicator data.

As mentioned above, indicator data may include one or more flags that indicate what operation is to be performed with the software update information by the network appliance. In one example, the indicator data indicates that both kernel data and application data within the network appliance is to be updated. In a second example, the indicator data indicates that only kernel data within the network appliance is to be updated. In a third example, the indicator data indicates that only the application data is to be updated within the network appliance.

Alternatively, the software update information may not include any indicator data. In which case, the network appliance determines the proper action to take with respect to the received software update information. In one example, the software update information includes a version number that the network appliance compares with the currently installed kernel data and application data. When the version number of the received software update information is more recent than the version number of the currently installed kernel data or application data version number, the network appliance determines that the more recent kernel data or application data is to be installed.

In another example, the software update information includes identifier data that the network appliance compares with an identifier assigned to the network appliance. The identifier may be a product type, serial number, etc. In the event that the identifier data included in the software update information does not match the identifier assigned to the network appliance, the network appliance determines that the software update information is not to be installed on the network appliance. In the event that the identifier data included in the software update information does match the identifier assigned to the network appliance, the network appliance determines that the software update information is to be installed on the network appliance.

Figure 6:
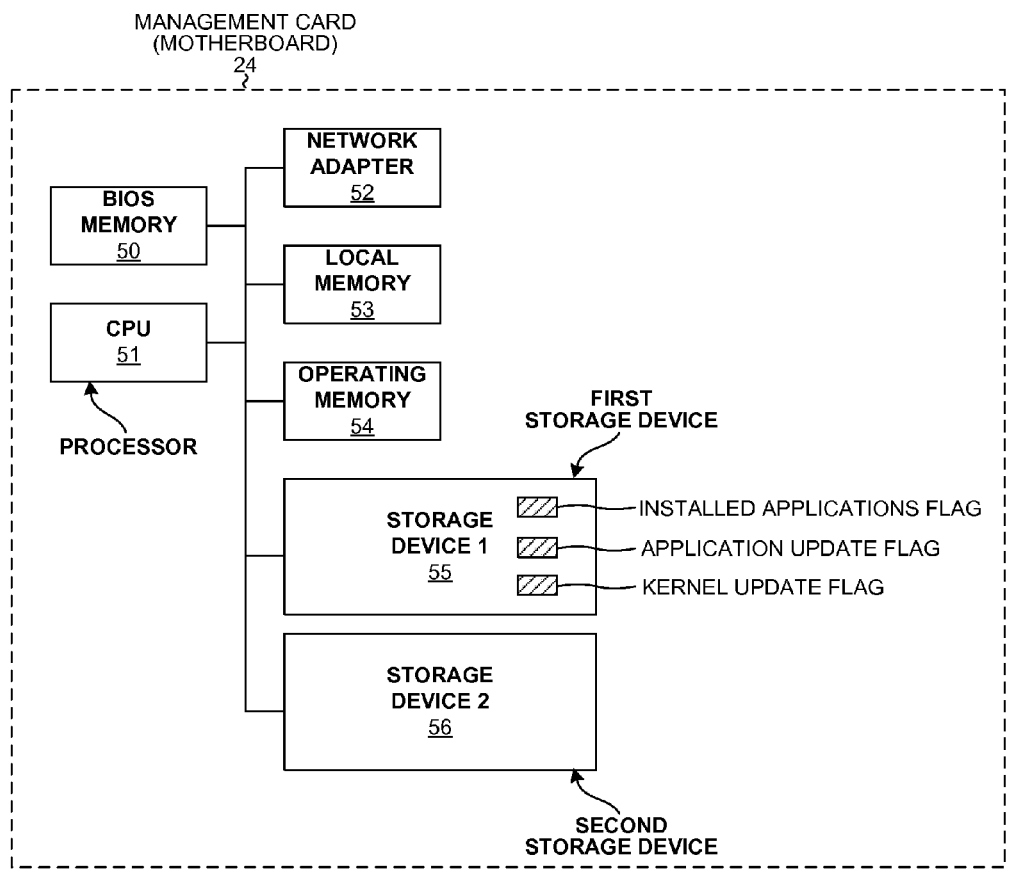
FIG. 6 is a simplified diagram of the management card (motherboard) 24 of the network appliance 20.

FIG. 6 is a diagram of the management card (motherboard) 24 included in the network appliance 20. The management card 24 includes Basic Input/Output System (BIOS) memory 50, Central Processing Unit (CPU) 51, Network adapter 52, local memory 53, operating memory 54, storage device 1 55, and storage device 2 56. BIOS memory 50 is a read-only memory (ROM) that contains instruction to be executed by the CPU 51 upon initial powering on. Network adapter 52 is any interface that allows communication with a network communication system, such as, Network Interface Card (NIC) for tethered connection to a network or a wireless adapter card for wireless connection to a network. One skilled in the art will readily appreciate the wide variety of network adapters that could be utilized to connect to a network. Local memory 53 is a memory medium that may be physically connected to the network appliance, such as, a Universal Serial Bus (USB) memory device, a Compact Disk Read Only Memory (CD-ROM), or a portable hard disk drive. Storage device 1 55 is a persistent memory device. Storage device 2 56 is a persistent memory device. In one example, storage device 1 and storage device 2 are two separate physical devices, such as, two separate hard disk drives or solid state drives included in the network appliance. In another example, storage device 1 and storage device 2 are merely two different portioned section of a single hard disk drive or solid state hard drive.

It is noted herein, that while one intended use of the present invention is to perform a remote software update, the methods of the present invention may also be used to perform a local software update wherein the software update information is communicated to the network appliance from a local storage device connected physically to the network appliance.

Figure 7:
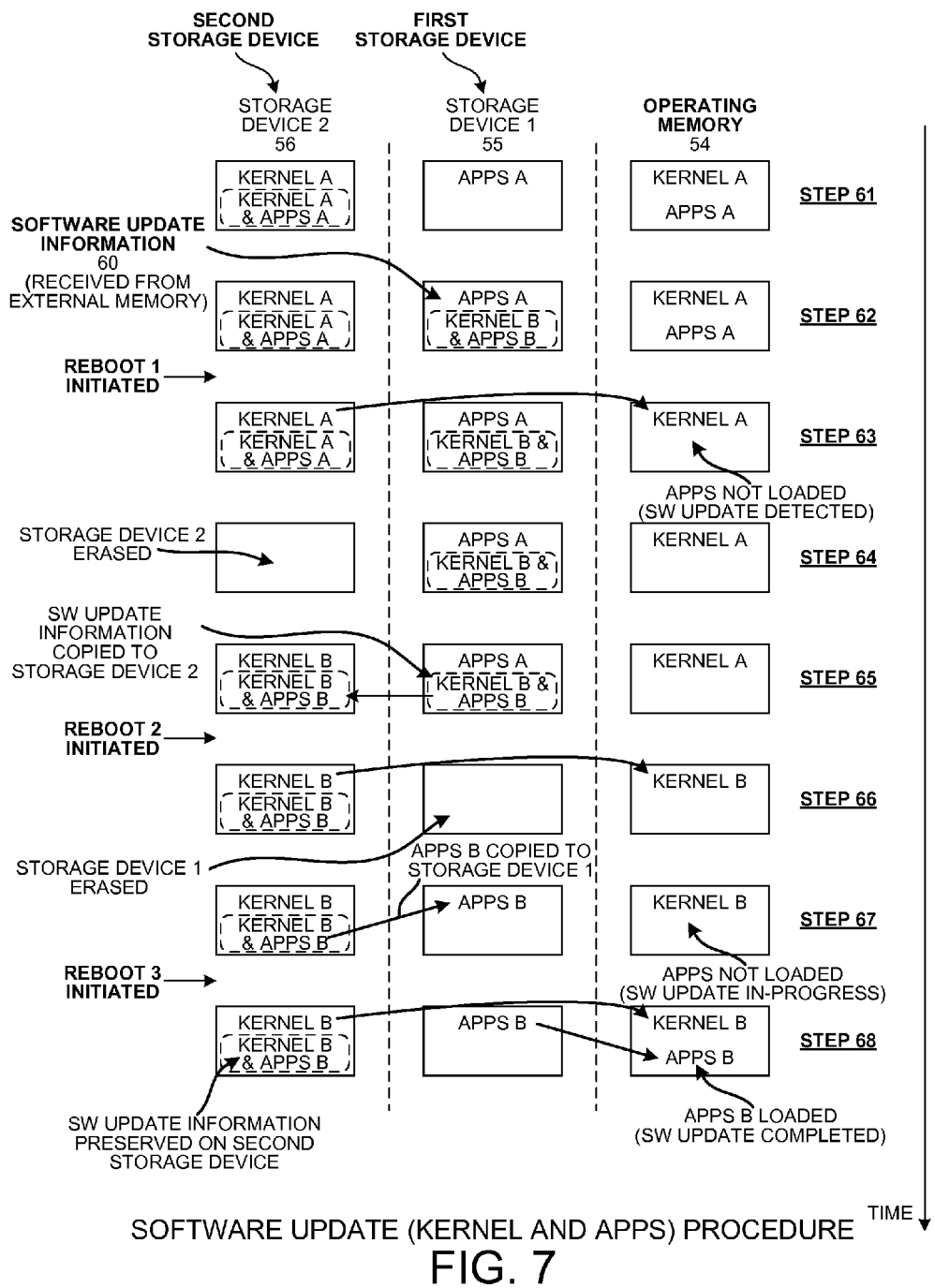
FIG. 7 is a diagram of a software update procedure where both kernel data and application data are updated within the network appliance.

FIG. 7 is a diagram of a software update procedure wherein both kernel data and application data are updated within the network appliance. This software update procedure includes eight steps (Step 61 through Step 68). Steps 61-68 are performed on management card 24 shown in FIG. 6. In this example, all indicator data is checked by the network appliance upon every reboot. The indicator data includes a kernel update flag, an application update flag, and an installed applications flag.

In step 61, version A of kernel data ("Kernel A") and version A of application data ("Apps A") is loaded into operating memory 54. Apps A is stored on storage device 1. Kernel A and Apps A are stored on storage device 2 56. In step 62, software update information 60 is received by the network appliance and stored on storage device 1 55. Software update information 60 includes updated kernel data ("Kernel B"), updated application data ("Apps B"), and indicator data. Once the software update has been received and stored, the network appliance initiates a reboot ("Reboot 1 Initiated"). In Step 63, upon reboot, the network appliance loads kernel A into operating memory 54. The network appliance then checks the indicator data included in the software update information. The installed applications flag is 1, the kernel update flag is 1, and the application update flag is 1. Based upon the status of the indicator flags the network appliance determines that a software update is in progress and Apps A is NOT loaded into operating memory 54. In step 64, storage device 2 56 is erased. The contents of storage device 1 55 and operating memory 54 are NOT altered. In step 65, Kernel B and Apps B are copied from storage device 1 55 to storage device 2 56 and all flags are set to "0". Then the network appliance initiates a reboot ("Reboot 2 Initiated"). In step 66, Kernel B is loaded into operating memory 54 and all indicator data is checked. The network appliance determines that the installed application Flag is "0" and proceeds to erase storage device 1 55. In step 67, Apps B is copied from storage device 2 56 to storage device 1 55 and the installed application flag is set to "1". Then the network appliance initiates a reboot ("Reboot 3 Initiated"). In step 68, Kernel B is loaded from storage device 2 56 into operating memory 54 and all indicator data is checked. The network appliance determines that the installed applications flag is "1" and loads Apps B from storage device 1 55 into operating memory 54. Upon completion of step 68, the software update procedure is complete and the both Kernel B and Apps B are loaded into operating memory 54.

Figure 8:
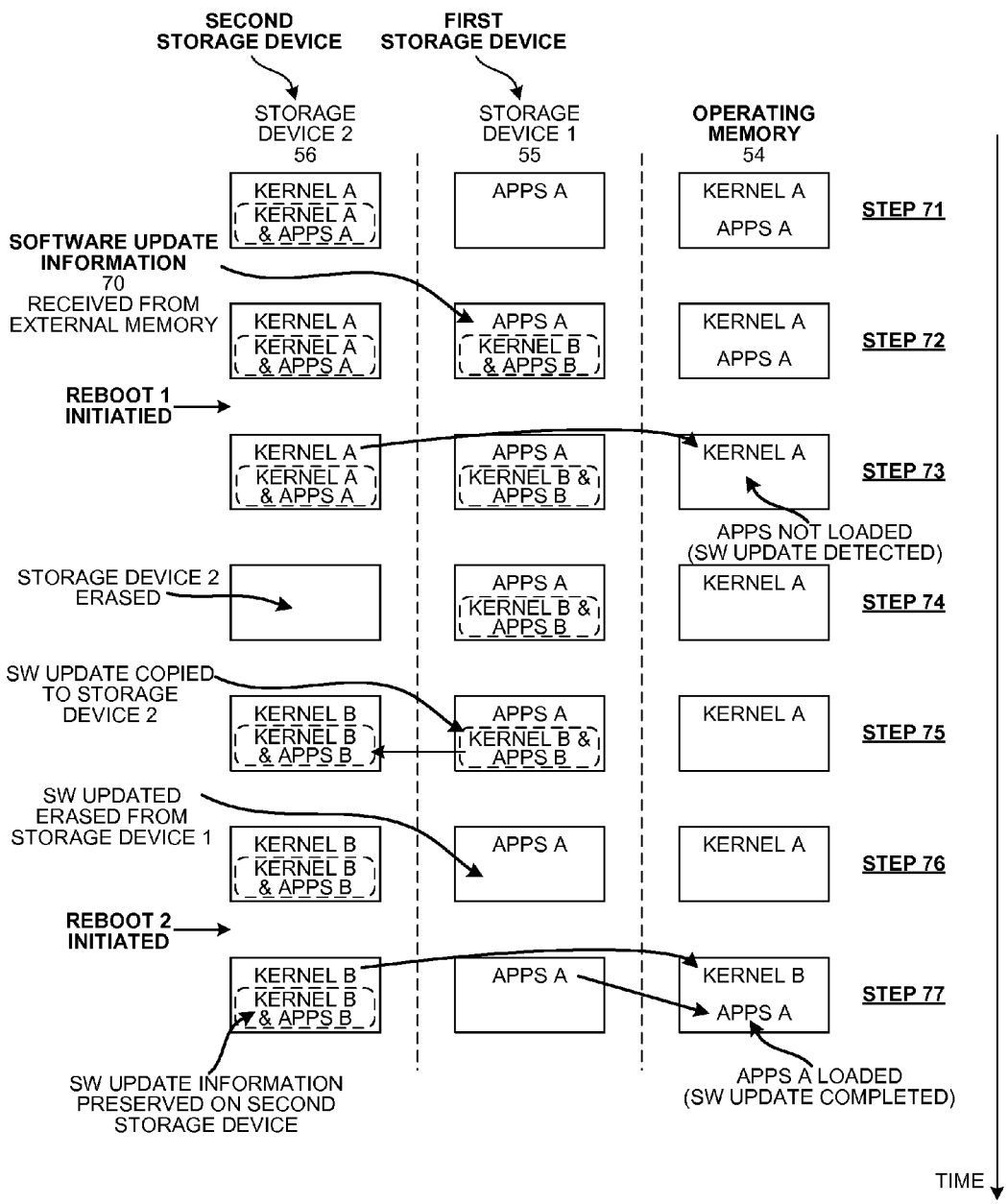
FIG. 8 is a diagram of a software update procedure where kernel data is updated within the network appliance.

FIG. 8 is a diagram of a software update procedure wherein kernel data is updated within the network appliance. This software update procedure includes seven steps (Step 71 through Step 77). Steps 71-77 are performed on management card 24 shown in FIG. 6. In this example, all indicator data is checked by the network appliance upon every reboot. The indicator data includes a kernel update flag, an application update flag, and an installed applications flag.

In step 71, version A of kernel data ("Kernel A") and version A of application data ("Apps A") is loaded into operating memory 54. Apps A is stored on storage device 1. Kernel A and Apps A are stored on storage device 2 56. In step 72, software update information 70 is received by the network appliance and stored on storage device 1 55. Software update information 70 includes updated kernel data ("Kernel B") and indicator data. Once the software update has been received and stored, the network appliance initiates a reboot ("Reboot 1 Initiated"). In Step 73, upon reboot, the network appliance loads kernel A into operating memory 54. The network appliance then checks the indicator data included in the software update information. The installed applications flag is 1, the kernel update flag is 1, and the application update flag is 0. Based upon the status of the indicator flags the network appliance determines that a software update is in progress and Apps A is NOT loaded into operating memory 54. In step 74, storage device 2 56 is erased. The contents of storage device 1 55 and operating memory 54 are NOT altered. In step 75, Kernel B and Apps B are copied from storage device 1 55 to storage device 2 56 and the kernel update flag is set to "0". In step 76, Kernel B and Apps B are then erased from storage device 1 55. Then the network appliance initiates a reboot ("Reboot 2 Initiated"). In step 77, Kernel B is loaded into operating memory 54 and all indicator data is checked. The network appliance determines that the installed applications flag is "1" and loads Apps A from storage device 1 55 into operating memory 54. Upon completion of step 68, the software update procedure is complete and the both Kernel B and Apps A are loaded into operating memory 54.

Figure 9:
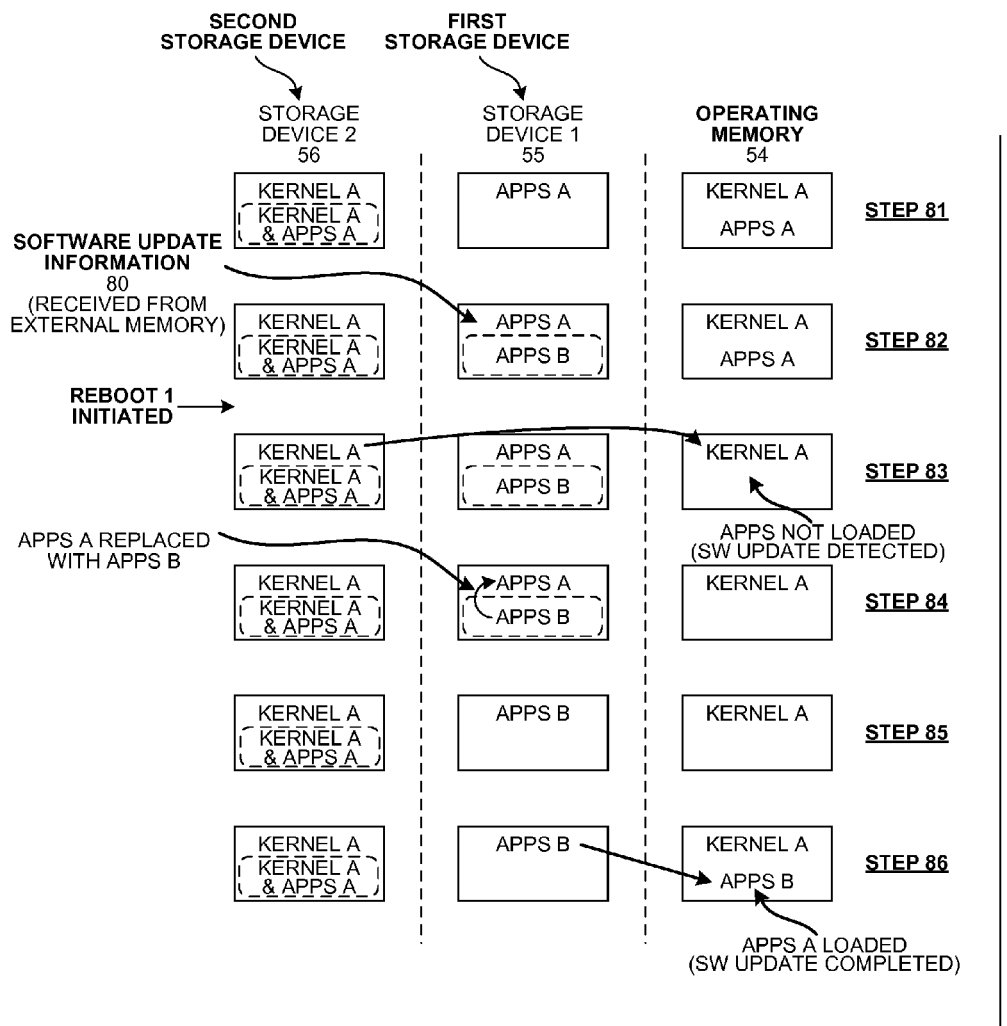
FIG. 9 is a diagram of a software update procedure where application data is updated within the network appliance.

FIG. 9 is a diagram of a software update procedure wherein application data is updated within the network appliance. This software update procedure includes six steps (Step 81 through Step 86). Steps 81-86 are performed on management card 24 shown in FIG. 6. In this example, all indicator data is checked by the network appliance upon every reboot. The indicator data includes a kernel update flag, an application update flag, and an installed applications flag.

In step 81, version A of kernel data ("Kernel A") and version A of application data ("Apps A") is loaded into operating memory 54. Apps A is stored on storage device 1. Kernel A and Apps A are stored on storage device 2 56. In step 82, software update information 80 is received by the network appliance and stored on storage device 1 55. Software update information 80 includes updated application data ("Apps B") and indicator data. Once the software update has been received and stored, the network appliance initiates a reboot ("Reboot 1 Initiated"). In Step 83, upon reboot, the network appliance loads kernel A into operating memory 54. The network appliance then checks the indicator data included in the software update information. The installed applications flag is 1, the kernel update flag is 0, and the application update flag is 1. Based upon the status of the indicator flags the network appliance determines that a software update is in progress and Apps A is NOT loaded into operating memory 54. In step 84, Apps A is erased from storage device 1 55 and Apps B is stored on storage device 1 55. The installed applications flag is set to 1. In step 85, the network appliance checks all flags and determines that installed applications flag is set to 1. In step 86, Apps B is copied from storage device 1 55 into operating memory 54. Upon completion of step 86, the software update procedure is complete and the both Kernel A and Apps B are loaded into operating memory 54.

Figure 10:
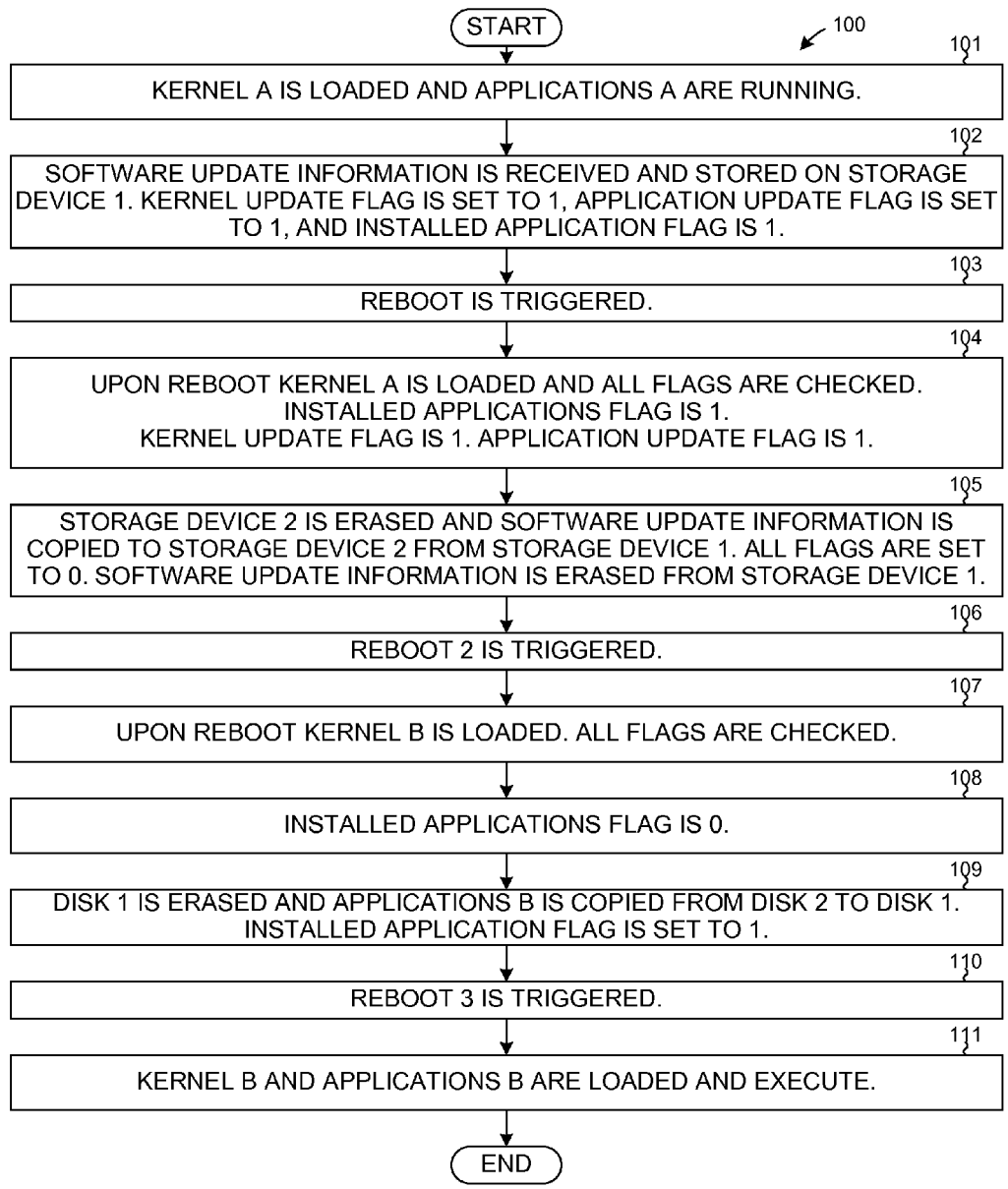
FIG. 10 is a flowchart of a software update procedure where both kernel data and application data are updated within the network appliance.

FIG. 10 is a flowchart of a software update procedure wherein both kernel data and application data are updated within the network appliance. This software update procedure is broken out into eleven steps (Step 101 through Step 111). In this example, all indicator data is checked by the network appliance upon every reboot. The indicator data includes a kernel update flag, an application update flag, and an installed applications flag.

In step 101, version A of the kernel ("Kernel A") and version A of the application ("Applications A") are running. (i.e. loaded into the operating memory of the network appliance). In step 102, software update information is received and stored on storage device 1. The software update information includes a new version of kernel data ("Kernel B") and a new version of application data ("Applications B"). The kernel update flag is set to 1, the application update flag is set to 1, and the installed application flag is 1. In step 103, a reboot is triggered. In step 104, Kernel A is loaded into the operating memory and all flags are checked. The installed applications flag is 1, the kernel update flag is 1, and the application update flag is 1. In step 105, storage device 2 is erased and the software update information is copied to storage device 2 from storage device 1. All flags are set to 0. The software update information is erased from storage device 1. Then reboot is triggered in step 106. In step 107, Kernel B is loaded and all flags are checked. In step 108, the network appliance determines that the installed applications flag is 0. In step 109, storage device 1 is erased and Applications B is copied from storage device 2 to storage device 1. Installed applications flag is then set to 1. In step 110, a reboot is triggered. Upon reboot in step 111, Kernel B and Applications B are loaded into operating memory and are executed.

Figure 11:
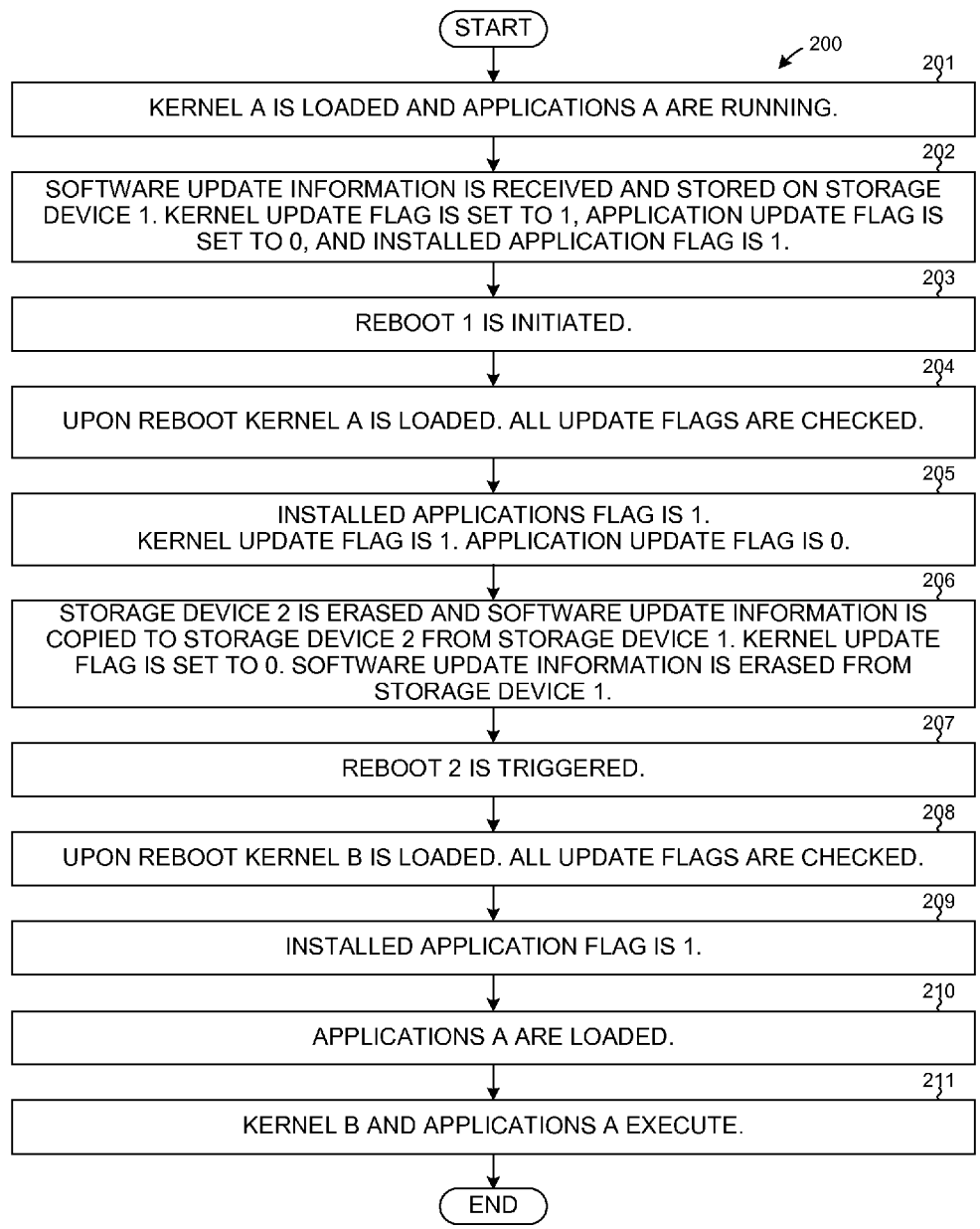
FIG. 11 is a flowchart of a software update procedure where kernel data is updated within the network appliance.

FIG. 11 is a flowchart of a software update procedure wherein only kernel data is updated within the network appliance. This software update procedure is broken out into eleven steps (Step 201 through Step 211). In this example, all indicator data is checked by the network appliance upon every reboot. The indicator data includes a kernel update flag, an application update flag, and an installed applications flag.

In step 201, version A of the kernel ("Kernel A") and version A of the application ("Applications A") are running. (i.e. loaded into the operating memory of the network appliance). In step 202, software update information is received and stored on storage device 1. The software update information includes a new version of kernel data ("Kernel B"). The kernel update flag is set to 1, the application update flag is set to 0, and the installed application flag is 1. In step 203, a reboot is triggered. In step 204, Kernel A is loaded into the operating memory and all flags are checked. In step 205 the network appliance determines that the installed applications flag is 1, the kernel update flag is 1, and the application update flag is 0.

In step 206, storage device 2 is erased and the software update information is copied to storage device 2 from storage device 1. Kernel update flag is set to 0. The software update information is erased from storage device 1. Then reboot is triggered in step 207. In step 208, Kernel B is loaded and all flags are checked. In step 209, the network appliance determines that the installed applications flag is 1. In step 210, Applications A are loaded into the operating memory. In step 211, Kernel B and Applications A are loaded into operating memory and are executed.

Figure 12:
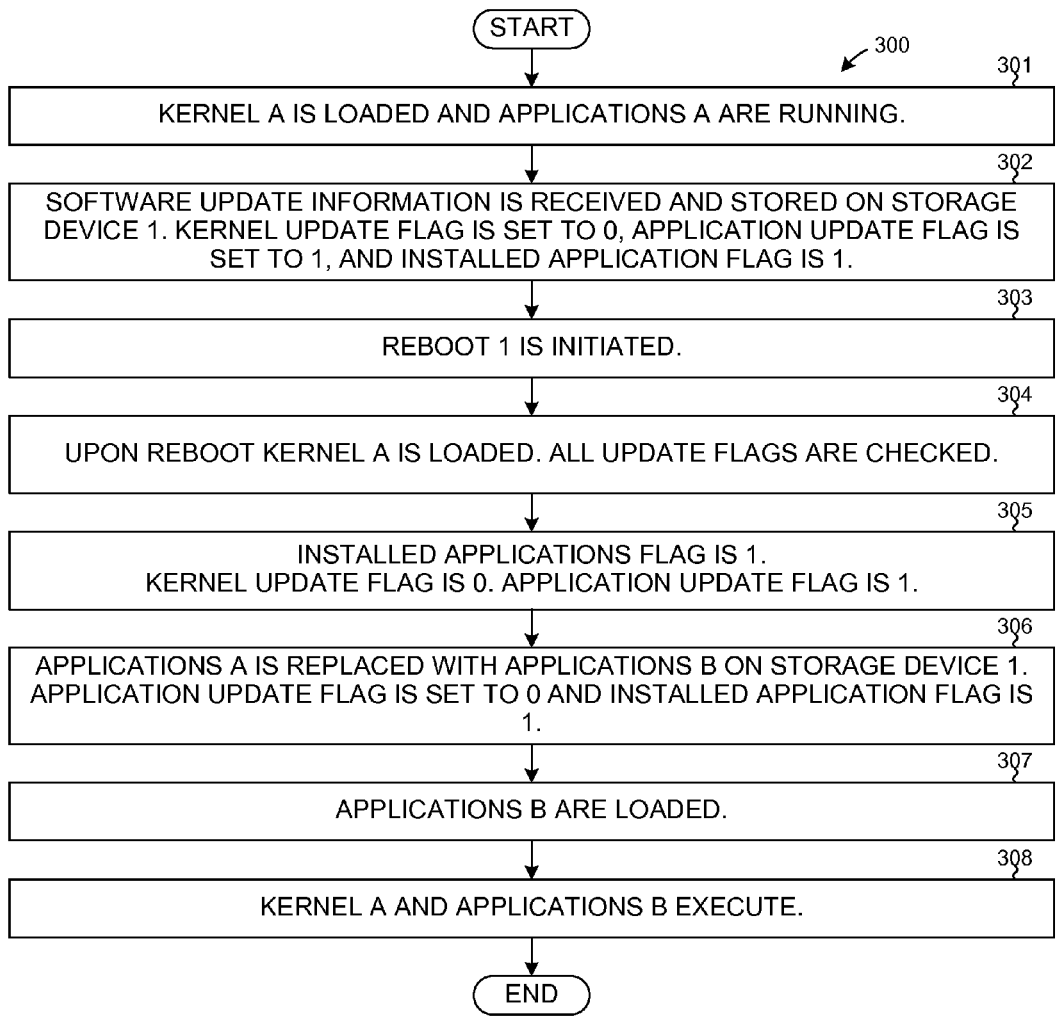
FIG. 12 is a flowchart of a software update procedure where application data is updated within the network appliance.

FIG. 12 is a flowchart of a software update procedure wherein only application data is updated within the network appliance. This software update procedure is broken out into eight steps (Step 301 through Step 308). In this example, all indicator data is checked by the network appliance upon every reboot. The indicator data includes a kernel update flag, an application update flag, and an installed applications flag.

In step 301, version A of the kernel ("Kernel A") and version A of the application ("Applications A") are running. (i.e. loaded into the operating memory of the network appliance). In step 302, software update information is received and stored on storage device 1. The software update information includes a new version of application data ("Applications B"). The kernel update flag is set to 0, the application update flag is set to 1, and the installed application flag is 1. In step 303, a reboot is triggered. In step 304, Kernel A is loaded into the operating memory and all flags are checked. In step 305 the network appliance determines that the installed applications flag is 1, the kernel update flag is 0, and the application update flag is 1. In step 306, Applications A are erased from storage device 1 and replace with Applications B. The applications update flag is set to 1. In step 307, Applications B are loaded into the operating memory. In step 308, Kernel A and Applications B are loaded into operating memory and are executed.

The software update mechanisms described herein provide a practical method for updating kernel and application data without local access to the network appliance. Use of the software update methods described herein provide solutions wherein network appliances can have had either or both kernel and application software updated regardless of the physical location of the network appliances. Therefore, allowing practical management of the kernels and applications installed on all network appliances regardless of the physical location of the network appliance.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

The invention claimed is:

1. A method of performing a software update, comprising:
   (a) loading a first application data from a first storage device onto an operating memory, wherein the operating memory stores a first kernel update flag value, and a first application update flag value;
   (b) loading a first kernel data from a second storage device onto the operating memory;
   (c) receiving software update information onto a device, wherein the software update information includes a second kernel data, a second kernel update flag value, and a second application update flag value, and wherein the device includes the first storage device, the second storage device, the operating memory, and a processor;
   (d) storing the software update information on the first storage device;
   (e) replacing the first kernel update flag value stored on the operating memory with the second kernel update flag value included in the software update information;
   (f) replacing the first application update flag value stored on the operating memory with the second application update flag value included in the software update information;
   (g) initiating a first reboot;
   (h) erasing the second storage device when the kernel update flag value stored in the operating memory is a first value;
   (i) not erasing the second storage device when the kernel update flag value stored in the operating memory is a second value;
   (j) copying the second kernel data included in the software update information from the first device to the second device when the kernel update flag value stored on the operating memory is the first value;
   (k) setting the kernel update flag to the second value;
   (l) initiating a second reboot;
   (m) loading the second kernel data stored on the second device onto the operating memory; and
   (n) loading the first application data stored on the first device onto the operating memory, wherein steps (a) through (n) are performed at least in part by the processor.

2. The method of claim 1, wherein the device is an island-based network flow processor.

3. The method of claim 1, further comprises:
   (k1) copying the software update information from the first storage device to the second storage device; and
   (k2) erasing the software update information from the first storage device.

4. The method of claim 1, wherein the first and second storage devices are persistent storage locations.

5. The method of claim 1, wherein the software update information is received from an external memory across a network.

6. The method of claim 1, wherein the software update information is received from an external memory physically connected to the device.

7. A method of performing a software update, comprising:
   (a) loading a first application data from a first storage device onto an operating memory, wherein the operating memory stores a first kernel update flag value, and a first application update flag value;
   (b) loading a first kernel data from a second storage device onto the operating memory;
   (c) receiving software update information onto a device, wherein the software update information includes a second application data, a second kernel update flag value, and a second application update flag value, and wherein the device includes the first storage device, the second storage device, the operating memory, and a processor;
   (d) storing the software update information on the second storage device;
   (e) replacing the first kernel update flag value stored on the operating memory with the second kernel update flag value included in the software update information;
   (f) replacing the first application update flag value stored on the operating memory with the second application update flag value included in the software update information;
   (g) initiating a first reboot;
   (h) copying the second application data included in the software update information from the second device to the first device when the application update flag value stored on the operating memory is a first value;
   (i) not copying the second application data included in the software update information from the second device to the first device when the application update flag value stored on the operating memory is a second value;
   (j) replacing the first application data stored on the first storage device with the second application data included in the software update information;
   (k) setting the application update flag to the second value;
   (l) loading the second application data stored on the first device onto the operating memory; wherein steps (a) through (l) are performed at least in part by the processor.

8. The method of claim 7, wherein the device is an island-based network flow processor.

9. The method of claim 7, wherein the first and second storage devices are persistent storage locations.

10. The method of claim 7, wherein the software update information is received from an external memory across a network.

11. The method of claim 7, wherein the software update information is received from an external memory physically connected to the device.

12. A method of performing a software update, comprising:
    (a) loading a first application data from a first storage device onto an operating memory, wherein the operating memory stores a first kernel update flag value, and a first application update flag value;

(b) loading a first kernel data from a second storage device onto the operating memory;

(c) receiving software update information onto a device, wherein the software update information includes a second kernel data, a second application data, a second kernel update flag value, and a second application update flag value, and wherein the device includes the first storage device, the second storage device, the operating memory, and a processor;

(d) storing the software update information on the first storage device;

(e) replacing the first kernel update flag value stored on the operating memory with the second kernel update flag value included in the software update information;

(f) replacing the first application update flag value stored on the operating memory with the second application update flag value included in the software update information;

(g) initiating a first reboot;

(h) erasing the second storage device when the kernel update flag value stored on the operating memory is a first value;

(i) not erasing the second storage device when the kernel update flag value stored on the operating memory is a second value;

(j) copying the second kernel data included in the software update information from the first device to the second device when the kernel update flag value stored on the operating memory is the first value;

(k) setting the kernel update flag to the second value;

(l) initiating a second reboot;

(m) loading the kernel data stored on the second device onto the operating memory;

(n) erasing the first storage device when the application update flag value stored on the operating memory is a first value;

(o) copying the second application data from the second storage device to the first storage device when the application update flag value stored on the operating memory is the first value;

(p) initiating a third reboot;

(q) loading the second kernel data from the second storage device onto the operating memory; and (r) loading the second application data stored on the first device onto the operating memory, wherein steps (a) through (r) are performed at least in part by the processor.

13. The method of claim 12, further comprises:

(k1) copying the software update information from the first storage device to the second storage device; and (k2) erasing the software update information from the first storage device.

14. The method of claim 12, wherein the first and second storage devices are persistent storage locations.

15. The method of claim 12, wherein the software update information is received from an external memory across a network.

16. The method of claim 12, wherein the software update information is received from an external memory physically connected to the device.

* * * * *